United States Patent [19]

Kakizaki

[11] Patent Number: 5,132,863
[45] Date of Patent: Jul. 21, 1992

[54] CASSETTE EJECT MECHANISM OF TAPE PLAYER

[75] Inventor: Eiichi Kakizaki, Kakuda, Japan

[73] Assignee: Alps Electric Co., Ltd., Tokyo, Japan

[21] Appl. No.: 644,643

[22] Filed: Jan. 23, 1991

[30] Foreign Application Priority Data

Feb. 14, 1990 [JP] Japan ................... 2-34931

[51] Int. Cl.$^5$ .................. G11B 5/008; G11B 15/24
[52] U.S. Cl. .................... 360/137; 360/96.5
[58] Field of Search ............ 360/96.5, 96.6, 93, 360/137, 105

[56] References Cited

U.S. PATENT DOCUMENTS

| 4,739,424 | 4/1988 | Yamada | 360/96.5 X |
| 4,885,648 | 12/1989 | Yoshimura | 360/96.5 |
| 4,991,044 | 2/1991 | Yanamoto et al. | 360/71 X |
| 5,018,032 | 5/1991 | Otsuki | 360/105 |

FOREIGN PATENT DOCUMENTS 55-84070 6/1980 Japan ................ 360/96.5

Primary Examiner—John H. Wolff
Attorney, Agent, or Firm—Guy W. Shoup; B. Noël Kivlin

[57] ABSTRACT

An eject mechamism of a tape player such as an automotive stereo tape player has a change-over gear driven by a motor and adapted to be locked at predetermined rotational angular positions. The position of a head base carrying a magnetic head is determined in accordance with the rotational angular position of the change-over gear. The eject mechanism also has a mode change-over lever adapted to be controlled by a cam rotatable together with the change-over gear so as to be set to one of first, second and third positions. The mode change-over lever, when set to the first or second position, selects one of a pair of pinch rollers to be put into contact with associated capstan, thus selecting forward or reverse running of the tape. The eject mechanism further has an eject timing member for conducting a switching operation to allow transmission of the power of the motor to an eject actuating mechanism when the mode change-over lever is set to the third position.

1 Claim, 11 Drawing Sheets

CASSETTE EJECT MECHANISM OF TAPE PLAYER

BACKGROUND OF THE INVENTION

1. Field of the Invention

The present invention relates to a tape player with a cassette loading and ejecting mechanisms, such as an automotive stereo audio tape player. More particularly, the present invention is concerned with a cassette eject mechanism of a tape player which is capable of ejecting a cassette with minimal power.

2. Description of the Related Art

In general, an automotive stereo audio tape player has a cassette eject mechanism which drives an inserted cassette half to a loaded position and automatically ejects the same when the playback is over. In a conventional eject mechanism, an exclusive solenoid is used as an actuator for directly actuating the eject mechanism. However, such a direct actuating system requires a solenoid of a large output power which undesirably increases the weight and power consumption.

Under this circumstance, an eject mechanism is disclosed in, for example, Japanese Utility Model Laid-Open Publication No. 61-3539 in which the eject mechanism is actuated by power derived from a motor. In this known system, however, the timing of start of the ejecting operation is determined by the operation of an exclusive solenoid.

In the known eject mechanisms described above, exclusive solenoids are used as the actuator for actuating the eject mechanism or as means for determining the timing of operation of the eject mechanism. Consequently, the weight of the eject mechanism is increased due to the presence of the solenoid and an additional circuit is required exclusively for driving and controlling the solenoid.

SUMMARY OF THE INVENTION

Accordingly, an object of the present invention is to provide an eject mechanism for a tape player in which a change-over gear for driving a head base of the player is used as means for determining the timing of operation of the eject mechanism, thus eliminating the need for the exclusive solenoid, thereby attaining reduction both in size and power consumption, and overcoming the above-described problems of the prior art.

To this end, according to the present invention, there is provided an eject mechanism of a tape player comprising: a change-over gear adapted to be rotatingly driven by a motor; a lock mechanism for locking the change-over gear at predetermined rotational angular positions; an actuator for actuating the lock mechanism; a head base carrying a magnetic head, the position of the head base being controlled in accordance with the angular position of the change-over gear at which the change-over gear is locked; a cam rotatable together with the change-over gear; a mode change-over lever adapted to be controlled by the cam to one of first, second and third positions, the mode changeover lever, when set to the first or second position, selects one of a pair of pinch rollers to be put into contact with associated capstan; an eject timing member for conducting a switching operation to allow transmission of the power of the motor to an eject actuating mechanism when the mode change-over lever is set to the third position; and a cassette eject member for ejecting a tape cassette when the eject actuating mechanism is driven by the power of the motor.

In the eject mechanism set forth above, the head base is moved by an amount corresponding to the angle of rotation of the change-over gear so as to be stopped at a plurality of positions. Modes such as play mode and stop mode are set in accordance with the position where the head base is stopped. At the same time, the cam rotates together with the change-over gear so as to move the mode change-over lever to one of first, second and third positions so as to determine which one of a pair of pinch rollers is to be brought into pressure contact with the capstan. When the mode change-over lever is moved to the third position, the eject timing member is driven by this lever so as to allow the power of the motor to be transmitted to the eject mechanism, so that the cassette eject member ejects the cassette half.

Thus, exclusive solenoid and associated parts, which are necessary in the conventional eject mechanisms for actuating the mechanism or for determining the timing, can be dispensed with in the eject mechanism of the present invention.

The above and other objects, features and advantages of the present invention will become clear from the following description of the preferred embodiment when the same is read in conjunction with the accompanying drawings.

BRIEF DESCRIPTION OF THE DRAWINGS

The accompanying drawings show an embodiment of the present invention in which.

DESCRIPTION OF THE PREFERRED EMBODIMENT

A preferred embodiment of the present invention will be described with reference to the accompanying drawings.

Figure 1A:
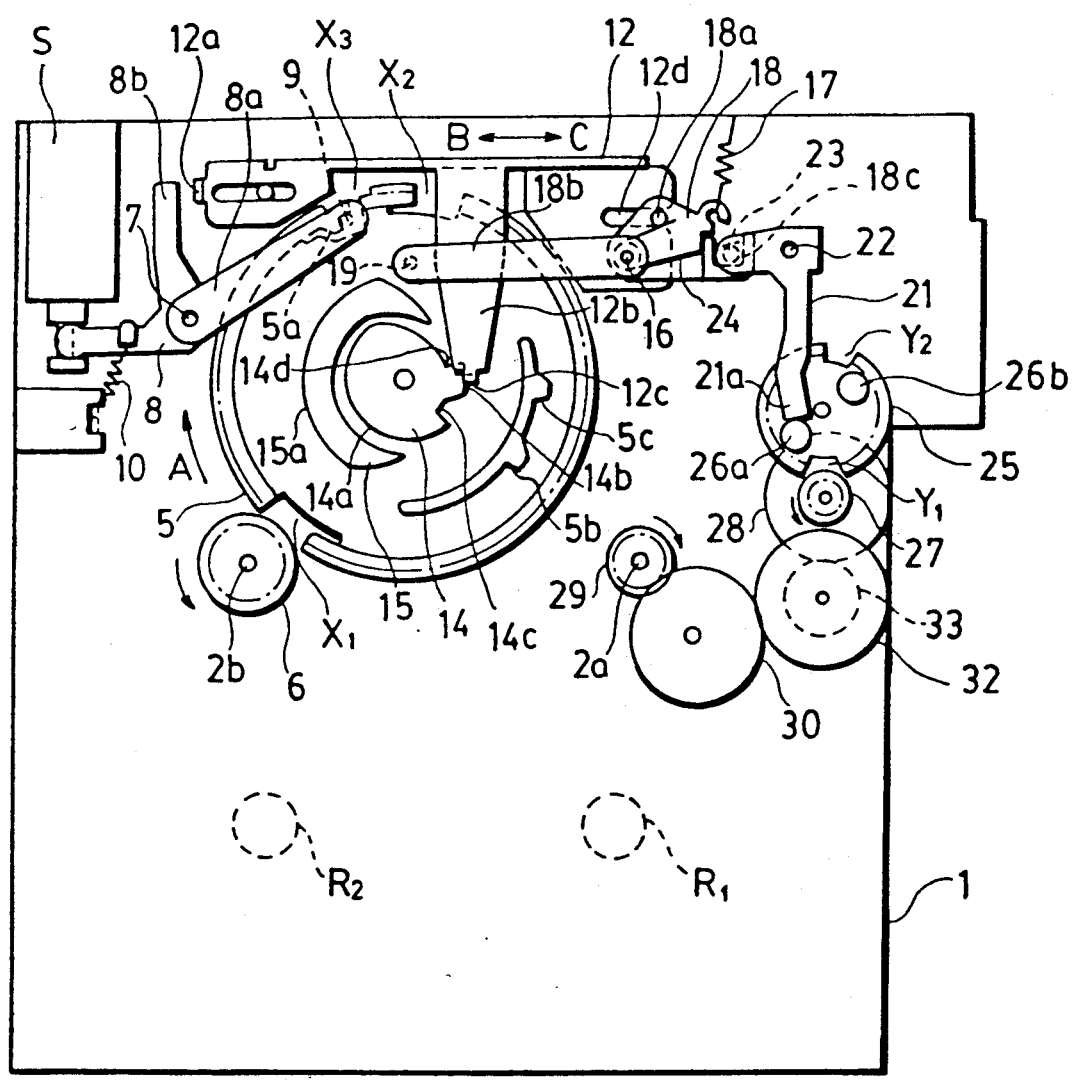
FIG. 1A is a bottom plan view showing the states of mechanism on the reverse side of a chassis of a tape drive unit in a stop mode.
Figure 1B:
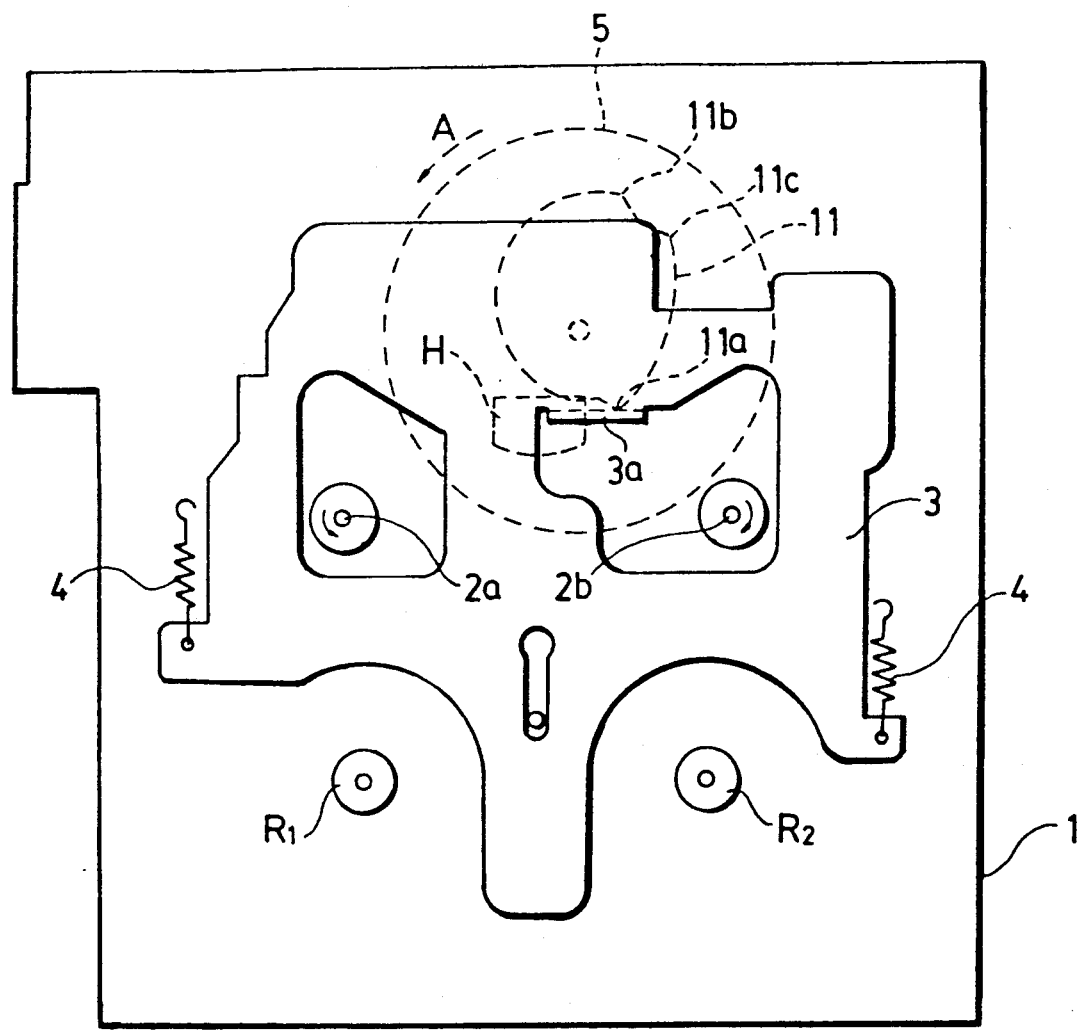
FIG. 1B is a top plan view of the chassis showing the state of the mechanism in the stop mode

Referring to FIGS. 1A and 1B, a chassis 1 of a tape drive unit carries a pair of reel bases $R_1$ and $R_2$, and a pair of capstans $2a$ and $2b$. The capstan $2a$ is for a forward feed of the tape, while the capstan $2b$ is for reverse feed of the tape. These capstans are adapted to be driven in counter directions, by a common motor. More specifically, the capstans 2a and 2b are formed integrally with fly-wheels which are driven by belts by a common motor so that these capstans are driven simultaneously.

Referring specifically to FIG. 1B, a hard base 3 is supported by the reverse side of the chassis 1 for a sliding motion in vertical directions as viewed in the FIG. The head base 3 is urged by a spring 4 upward as viewed in the FIG. The head base 3 carries a magnetic head H so that the magnetic head H is moved to different positions corresponding to different modes in accordance with the movement of the head base 3.

A change-over gear 5 provided on the reverse side of the chassis 1 has peripheral teeth engageable with a drive gear 6 integral with one of the capstans. The changeover gear 5 has non-toothed regions $X_1$, $X_2$, $X_3$. The torque of the drive gear 6 is not transmitted to the change-over gear 5 when one of these non-toothed portions $X_1$, $X_2$, $X_3$ opposes the drive gear 6.

As will be seen from FIG. 1A, three stopper portions 5a, 5b and 5c are formed on the reverse side of the changeover gear 5. Numeral 8 denotes a trigger lever which is rotatably supported by a shaft 7 and which is constantly urged by a spring 10 counterclockwise as viewed in FIG. 1A. When a solenoid S is energized, the trigger lever is driven clockwise against the force of the spring 10. The trigger lever 8 has an arm 8a which is provided with a lock pin 9. In the state shown in FIG. 1A, the stopper 5a is retained by the stopper 5a so that the change-over gear 5 is stopped. In this state, the driving gear 6 is faced by the non-toothed region $X_1$ of the change-over gear 5, thus establishing the stop mode. A rotation of the change-over gear 5 in the direction of the arrow A causes the stopper 5b to be retained by the lock pin 9, so that the change-over gear 5 is locked in a state in which its non-toothed region $X_2$ opposes the drive gear 6. This state is the play mode. A further rotation of the change-over gear causes the stopper 5c to be retained by the lock pin 9. A cue mode or a review mode is thus established with the nontoothed region $X_3$ of the change-over gear 5 opposing the drive gear 6.

As shown in FIG. 1B, a head base drive cam 11 is formed integrally with the surface of the change-over gear 5. The aforementioned head base 3 is partly bent to provide a tab 3a which is urged by a spring 4 into pressure contact with the outer peripheral surface of the cam 11. The arrangement is such that the head base 3 is displaced downward as viewed in FIG. 3 by the rotation of the cam 11.

In the state shown in FIG. 1B, the tab 3a is in contact wit a portion 11a of the cam 11. In this state, the head base 3 has been moved to the upper side as viewed in the FIG., thus realizing the stop mode. In the state shown in FIG. 2B which illustrates the state of the play mode, the head base has been displaced to the lower side as viewed in the FIG. since a portion 11b of the cam 11 is contacted by the tab 3a. In the cue mode shown in FIG. 4B, the tab 3a contacts with a portion 11c of the cam 11 and the head base 3 has been slightly moved to an upper position in the FIG.

Referring again to FIG. 1A, a mode change-over lever 12 is provided on the reverse side of the chassis 1 for a sliding movement in the directions of arrows B and C. The mode change-over lever 12 is constantly urged by a spring (not shown) in the direction of the arrow B. The end of the mode change-over lever 12 as viewed in the direction of the arrow B is partly bent to provide a pressed tab 12a which opposes the arm 8b of the trigger lever 8. When the solenoid S is energized to rotate the trigger lever 8 clockwise as viewed in FIG. 1A, the arm 8b operates to push the mode change-over lever 12 in the direction of the arrow C.

The mode change-over lever is bent to provide an arm 12b the end of which is also bent to form a sliding portion 12c.

As will be seen from FIG. 1A, an inner cam 14 and an outer cam 15 are formed on the reverse side of the change-over gear 5. Since the mode change-over lever 12 is urged by the spring in the direction of the arrow B, the sliding portion 12c slides on the outer periphery of the inner cam 14 or the outer periphery of the outer cam 15, thus determining the position of the mode change-over lever 12 in the directions of the arrows B and C. When the sliding portion 12c contacts the outer peripheral surface 14a, 14b of the inner cam 14, the mode change-over lever 12 is moved in the direction of the arrow B to a first position. On the other hand, when the sliding portion 12c slides on the outer peripheral surface 15a of the outer cam 15, the mode change-over lever 12 moves in the direction of the arrow C to a second position. A pair of recesses 14c and 14d are formed in the outer periphery of the inner cam 14. When the sliding portion 12c is moved into the recess 14c or 14d by the biasing force of the spring, the mode change-over lever 12 is further moved in the direction of the arrow B beyond the first position so as to be set to a third position.

Referring to FIG. 1A, an eject change-over lever 18 is rotatably supported by a shaft 16 and is normally urged counterclockwise by a spring 17. The eject change-over lever 18 is provided with a pin 18a. A restriction groove 12d is formed in the end of the mode change-over lever 12 as viewed in the direction of the arrow C. The pin 18a mentioned above is adapted to be received in this restriction groove 12d.

In the state shown in FIG. 1A, the mode change-over lever 12 is in the first position. When the mode change-over lever is set in the first position or in the second position which is spaced from the first position in the direction of the arrow C, the pin 18a is held in the restriction groove 12d so that the eject change-over lever 18 is maintained in the position shown in FIG. 1A. Conversely, when the sliding portion 12c is moved into the recess 14c or 14d of the inner cam 14, the mode change-over lever 12 is moved to the third position so that the restriction groove 12d is moved apart from the pin 18a to release the latter. However, when the sliding portion 12c moves into the recess 14d, a restriction pin 119 on the end of the arm 18b of the eject change-over lever 18 contacts the outer peripheral surface 15a of the outer cam 15, so as to prevent counterclockwise rotation of the eject changeover lever 18 even after the release of the pin 18a. Consequently, the eject change-over lever is held in the state shown in FIG. 1A. When the sliding portion 12c is moved into the recess 14c so as to disengage the pin 18a from the restriction groove 12d, the eject change-over lever 18 is completely released so as to be rotated counterclockwise by the force of the spring 17.

Referring to FIG. 1A, an eject timing lever 21, provided with a pin 23, is rotatably supported by the shaft 22. The pin 23 is received in the recess 18c of the eject changeover lever 18. The pin 23 is urged into the recess 18c by the force of a spring 24.

An intermittent gear 25 is supported on the reverse side of the chassis 1. The intermittent gear 25 is provided with two lock pins 26a and 26b. In the state shown in FIG. 1A, one 26A of the lock pins is held in contact with the end of the arm 21a of the eject timing lever 21. Thus, the intermittent gear 25 is locked for each 180° rotation as the lock pins 26a and 26b alternately contact the end of the arm 21a. The intermittent gear 25, which is adapted to mesh with a transmission gear 27, has two non-toothed portions $Y_1$ and $Y_2$. When the intermittent gear 26 is locked by the lock pin 26a or 26b, the nontoothed portion $Y_1$ or $Y_2$ face the transmission gear 27 so as to stop transmission of the power from the transmission gear 27 to the intermittent gear 25. A large-diameter gear 28 is provided on the transmission gear 27 integrally therewith. The power from a gear 29 integral with the aforementioned capstan 2a is transmitted to the large diameter gear 28 through an idle gear 30 and intermediate gears 32, 33 so that the transmission gear 27 is rotated counterclockwise.

Figure 6A:
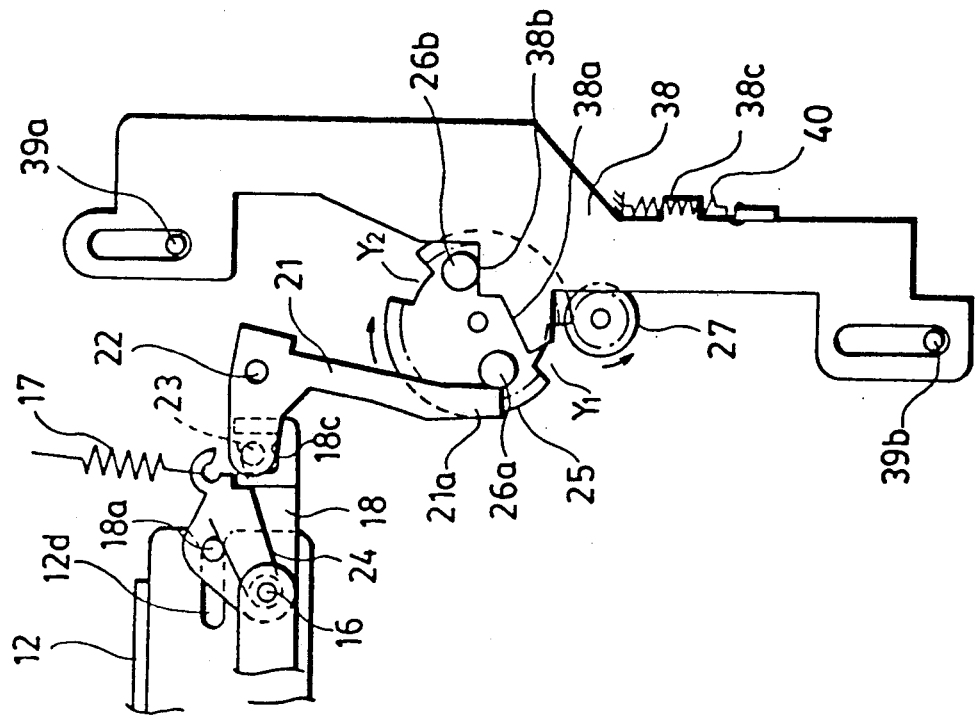
FIGS. 6A and 6B are bottom plan view of the chassis in different phases of operation of a mechanism for determining eject timing.
Figure 6B:
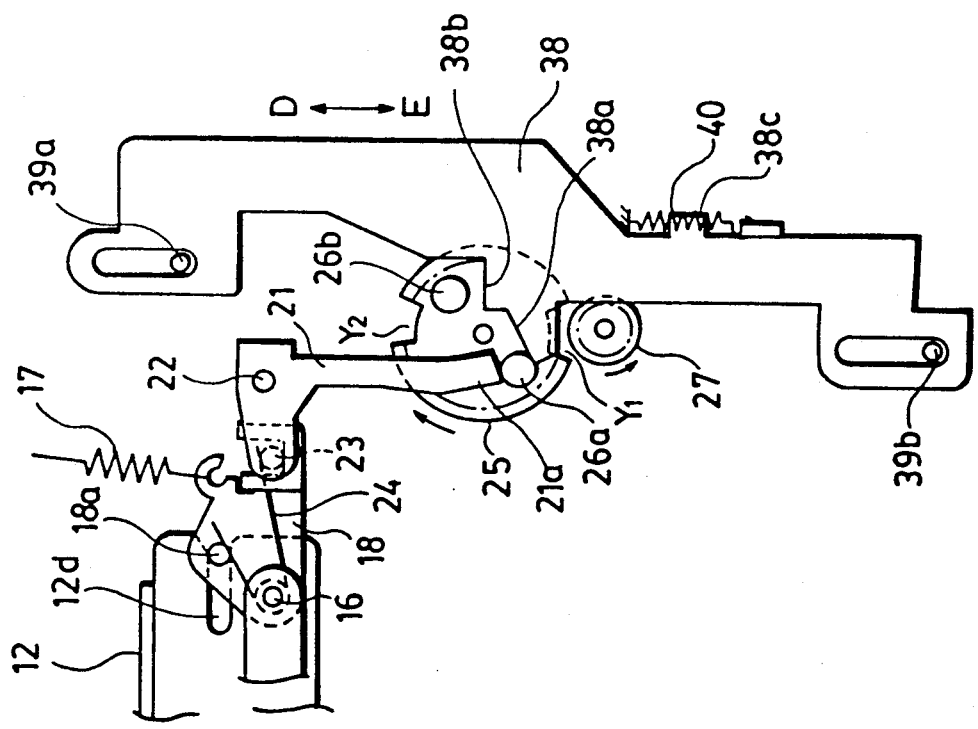

FIGS. 6A and 6B show an eject drive gear 38 which is driven by the intermittent gear 25. The eject drive gear 38 is supported by pins 39a, 39b on the chassis 1 for sliding movement in the directions of the arrows D and E. At the same time, the eject drive lever 38 is urged by the spring 40 in the direction of the arrow D. The eject drive lever 38 has a lock side 38a and a pressed side 38b. In the state shown in FIG. 6A, the lock side 38a of the eject drive lever 38 contacts the lock pin 26a by the urging force of the spring 40 so as to lock the eject drive lever 38.

When the arm 21a of the eject timing lever 21 comes off the lock pin 26a, the non-toothed portion $Y_1$ of the intermittent gear 25 is moved and, instead, the toothed portion of the intermittent gear 25 is moved into engagement with the transmission gear 27, whereby the intermittent gear 25 is rotated clockwise by the power of the transmission gear 27.

In this state, as shown in FIG. 6B, the pressed side 38b of the eject drive gear 38 is pressed in the direction of an arrow E by the other lock pin 26b, so that the eject drive lever 38 makes one cycle of reciprocating motion in the direction of the arrow E. A driving tab 38c projects from the lower right edge of the eject drive lever 38. An eject member which will be described hereinunder operates in response to the above-mentioned one cycle of reciprocating motion of the driving tab 38c.

Figure 7A:
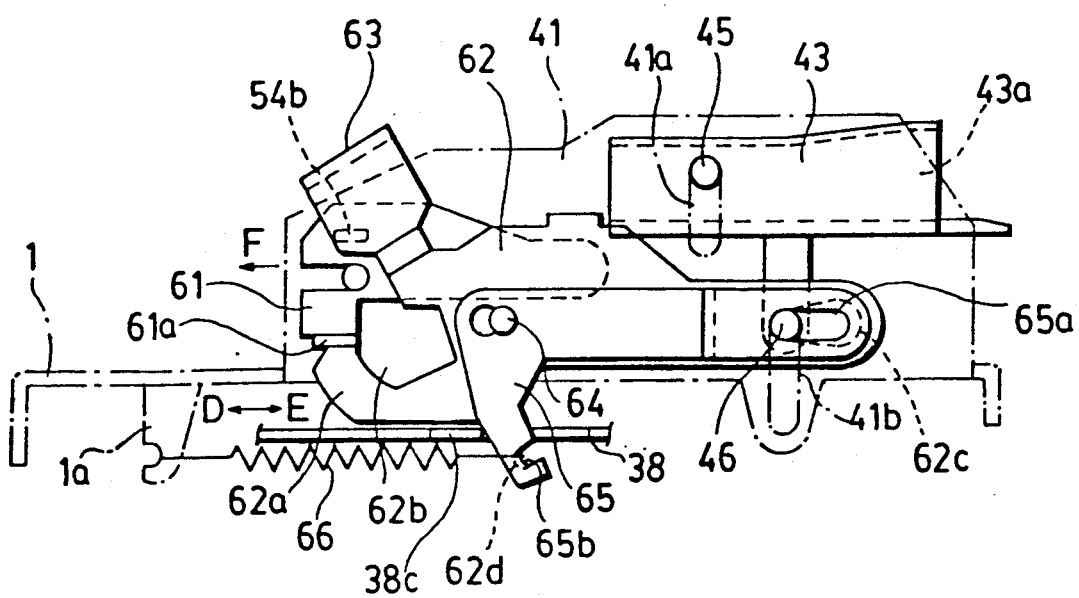
FIGS. 7A and 7B are bottom plan view of the chassis in different phases of operation of an eject member.

FIGS. 7A onwards show a driving arrangement for driving the cassette eject member.

Figure 9:
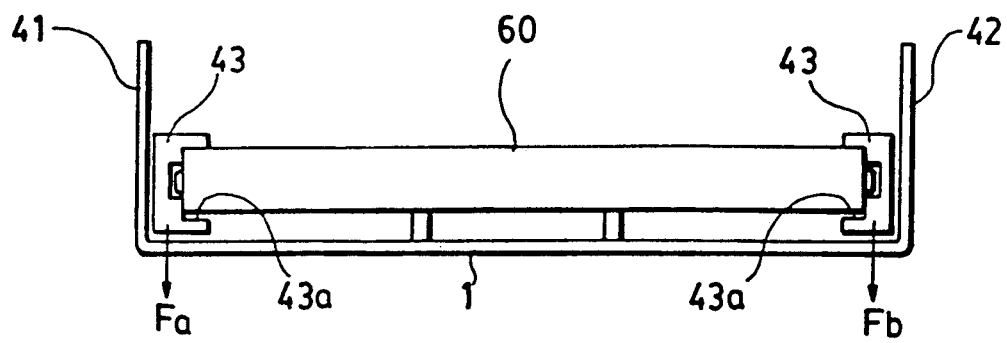
FIG. 9 is a front elevational view of the cassette eject member.

As will be seen from FIG. 9, both lateral sides of the chassis 1 are bent vertically to form side panels 41 and 42. One 41 of the side panels has elongated holes 41a and 41b extending in vertical directions, as shown in FIG. 7A. Similarly, elongated holes are formed in the other side panel 42. As will be seen from FIG. 9, a pair of symmetrical cassette holders 43 are arranged between both side panels 41 and 42. Both cassette holders 43 have guide grooves 43a formed in the opposing surfaces thereof. The guide grooves 43a have a height and a width which allows both side surfaces of cassette halves 60 to slide between. A guide pin 45 and a connector pin 46 are formed on the outer surface of each cassette holder 43. The cassette holder 43 adjacent the side panel 41 is mounted on the chassis 1 and free to move vertically, with its guide pin 45 and connector pin 46 slidingly received in the elongated holes 41a and 41b of the side panel 41, respectively. Similarly, the cassette holder adjacent the side panel 42 is supported and free to move vertically, with its guide pin and connector pin slidably received in the respective elongated holes.

Figure 8:
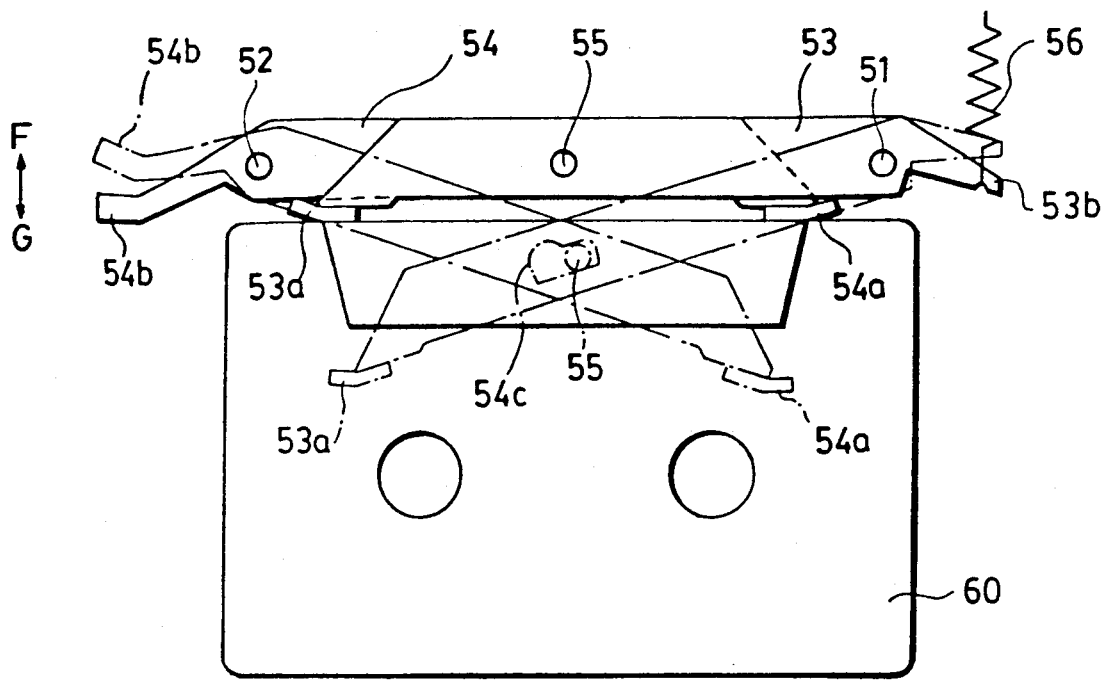
FIG. 8 is a top plan view of the tape chassis illustrative of operation of the cassette eject member.

Referring now to FIG. 8, a pair of fulcrum pins 51 and 52 are provided on the surface of the chassis 1. An eject lever 53 has a bore which receives one 51 of the fulcrum pins so that the eject lever 53 is rotatable around this fulcrum pin 51. Similarly, another eject lever 54 is rotatably supported by the other fulcrum pin 52. The first-mentioned eject lever 53 is disposed above the second-mentioned eject lever 54. A connector pin 55 provided on the eject lever 53 is freely received in a hole 54c formed in the other eject lever 54. These eject levers 53 and 54 are adapted to extend in an X-like form as indicated by one-dot-and-dash line in FIG. 8. The elongated hole 54c is configured so as to absorb any offset of this hole from the connector pin 55 during expanding and contracting operation of the eject levers 53, 54. The eject levers 53 and 54 are bent at their ends so as to form pressing portions 53a and 54a. A spring 56 is stretched between the side panel 42 of the chassis 1 and a hook 53b which is formed on the base end of one 53 of the eject lever, so that both eject levers 53 and 54 are urged into expanded state as shown by one-dot-and-dash line in FIG. 8. A driving tab 54b provided on the base end of the eject lever 54 projects to the exterior through the side panel 41.

Figure 7B:
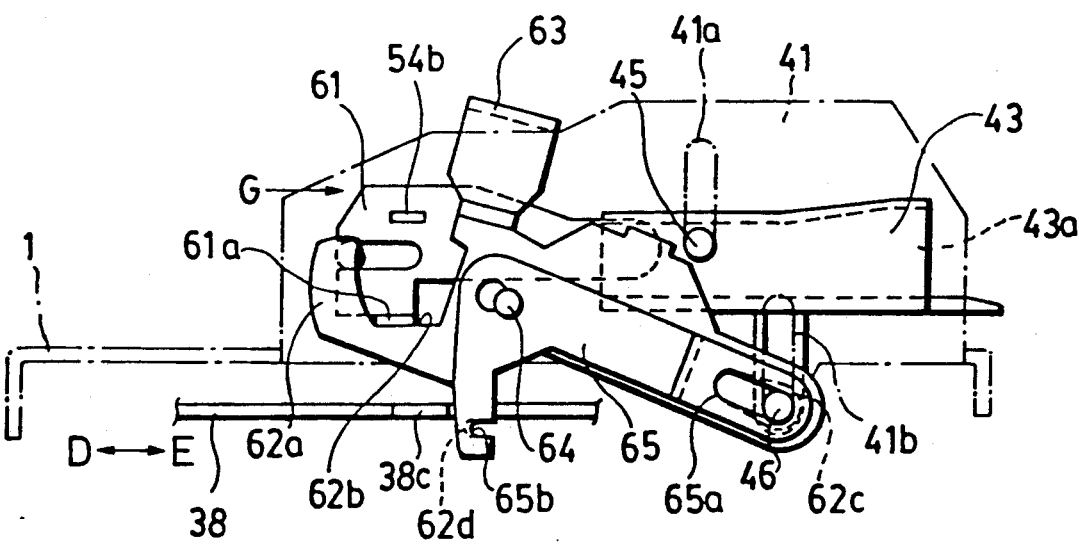

As will be seen from FIGS. 7A and 7B, a lock lever 61 is provided on the surface of the left side panel 4 of the chassis 1. The lock lever 61 is supported by the side panel 41 for horizontal sliding motion. The above-mentioned driving tab 54b of the eject lever 54 engages with this lock lever 61. As shown in FIG. 8, therefore, a movement of the driving tab 54b of the eject lever 54 in the direction of the arrow F or G causes the lock lever 61 to move from the position F shown in FIG. 7A to the position G shown in FIG. 7B. The lower end of the lock lever 61 is bent to provide a retaining portion 61a.

A drive link 62 on one of the side panels is connected through a connector plate 63 to a drive link on the other side panel 42. Both drive links 62 and the connector plate 63 may be formed by bending a single sheet. The drive links 62 are provided with support holes which receive support pins 64 provided on the outer surface of the side panels so that the drive links 62 are rotatable together with the connector plate 63 about the axis of the support pins 64.

The drive link 62 is provided with an upward projection 62a and a recess 62b laterally spaced from the projection 62a. The retaining portion 61a of the lock lever 61 is positioned to oppose the projection 62a or the recess 62b.

A connector hole 62c is formed in the end of the drive link 62. The connector pin 46 provided on the left cassette holder 43 projects laterally outward from the side panel 41 through the elongated hole 41c. The end of this pin 46 is received in the connector hole 62c of the drive link 62. Consequently, the cassette holder 43 is moved up and down in response to a rotation of the drive link 62 about the support pin 64.

A forcible bias link 65 is provided on the outer side of the drive link 62. This forcible bias link 65 has a support hole receiving the support pin 64 on the outer surface of the side panel 41 so that it is supported by the support pin 64 for rotation. The arrangement is such that the forcible bias link 65 and the drive link 62 rotate independently of each other about a common axis provided by the support pin 64. An elongated hole 65a is formed in the end of the forcible bias link 65. The connector pin 46 of the left cassette holder 43 is received commonly in the connector hole 62c of the drive link 62 and the elongated hole 65a in the forcible bias link 65.

As will be seen from FIG. 7A, a hook groove 62d is formed in the lower end of the drive link 62. Similarly, a hook groove 65b is formed in the lower end of the forcible bias link 65. A spring 66 is retained at its one end commonly by the hook groove 62d and the hook groove 65b. The other end of the spring 66 is retained by a hook 1a provided on the lower surface of the chassis 1. The spring 66 produces an elastic force by which the forcible bias link 65 and the drive link 62 are urged clockwise.

The driving tab 38c of the eject drive lever 38 shown in FIGS. 6A and 6B oppose the lower ends of the drive link 62 and the forcible bias link 65.

A description will now be given of the operation of the described embodiment.

The operation of the mechanism provided on the chassis 1 will be described with reference to FIGS. 1A to 5, 6A and 6B.

Referring first to FIGS. 1A and 1B showing the eject device in the stop mode, motor power is transmitted to a fly-wheel and the capstan 2a with the gear 29 and the capstan 2b with the drive gear 6 are rotated in counter directions by the torque transmitted from the fly-wheel. In this stop mode, the solenoid S is not energized so that the trigger lever 8 has been urged counterclockwise by the spring 10. In consequence, the lock pin 9 on the arm 8a has been stopped by the stopper 5a and the change-over gear 5 has been locked. In this state, the non-toothed region $X_1$ of the change-over gear 5 opposes the drive gear 6 so that the torque of the drive gear 6 is not transmitted to the change-over gear 5. In this state, as shown in FIG. 1B, the portion 11a of the cam 11 formed on the upper surface of the change-over gear 5 abuts the tab 3a so that the head base has been retracted upward as viewed in the FIG. by the force of the spring 4. Therefore, the magnetic head H has been spaced from the tape and the pair of pinch rollers (not shown) which are moved by the head base 3 are set apart from the capstans 2a,2b.

When the solenoid S is energized in this stop mode, the trigger lever 8 is rotated clockwise so that the lock pin 9 is disengaged from the stopper 5a of the change-over gear 5. Since the reset force produced by the spring 4 on the head base 4 acts on the change-over gear 5 through the cam 11 so as to urge the change-over gear 5 in the direction of the arrow A, the change-over gear 5 rotates in the direction of the arrow A.

In this stop mode, the sliding portion 12c of the mode change-over lever 12 contacts the outer peripheral surface of the inner cam 14 so that the mode change-over lever 12 is set in the first position. In this state, the pin 18a of the eject change-over lever 18 is caught in the restriction groove 12d of the mode change-over lever 12, thus holding the eject change-over lever 18 against the rotational biasing force of the spring 17. Therefore, the eject timing lever 21 has been rotated counterclockwise by the force of the spring 24, so that the intermittent gear 25 is locked by the engagement between the arm 21a and the lock pin 26a.

Figure 2A:
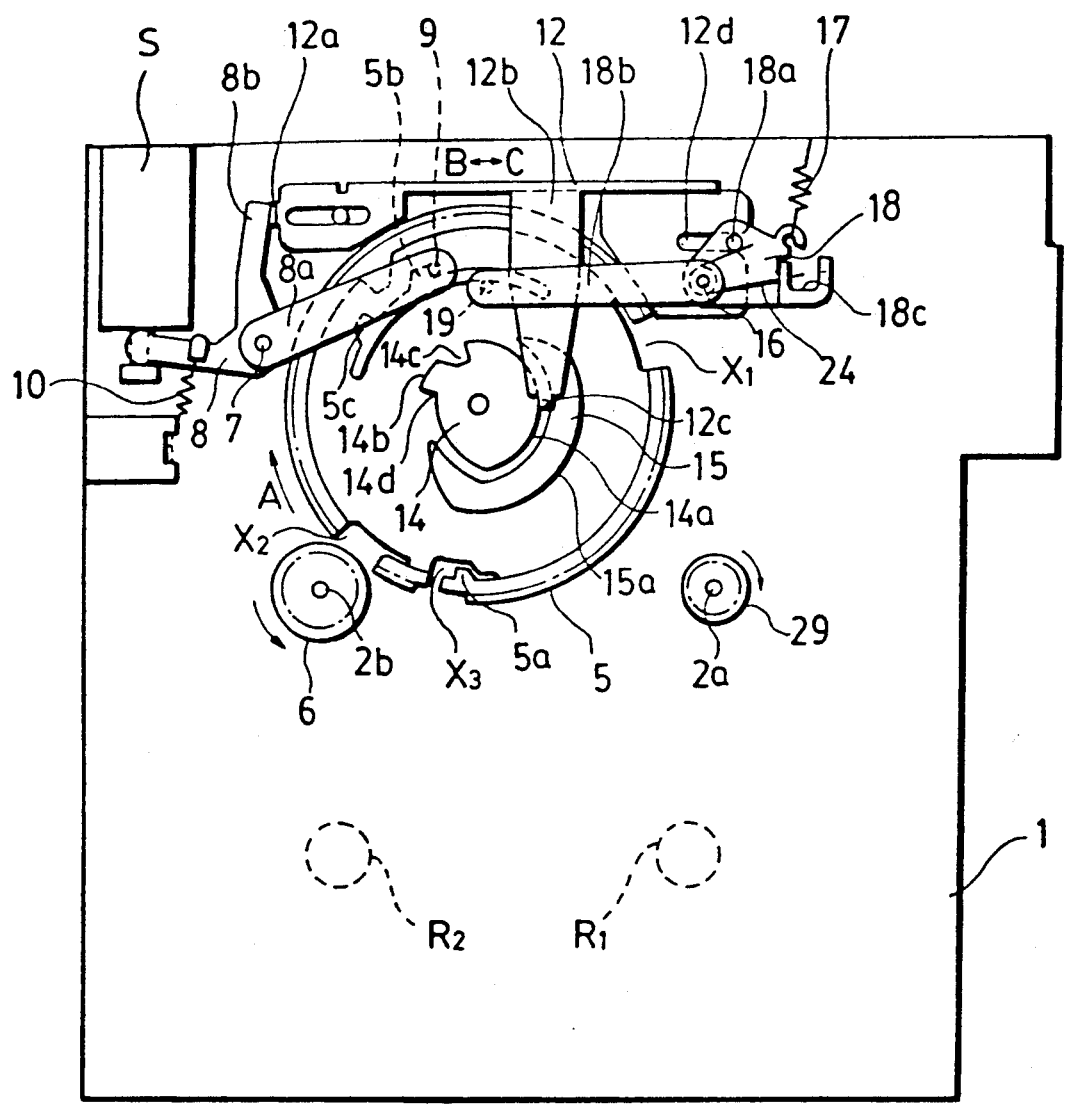
FIG. 2A is a bottom plan view of the chassis in a forward play mode.
Figure 2B:
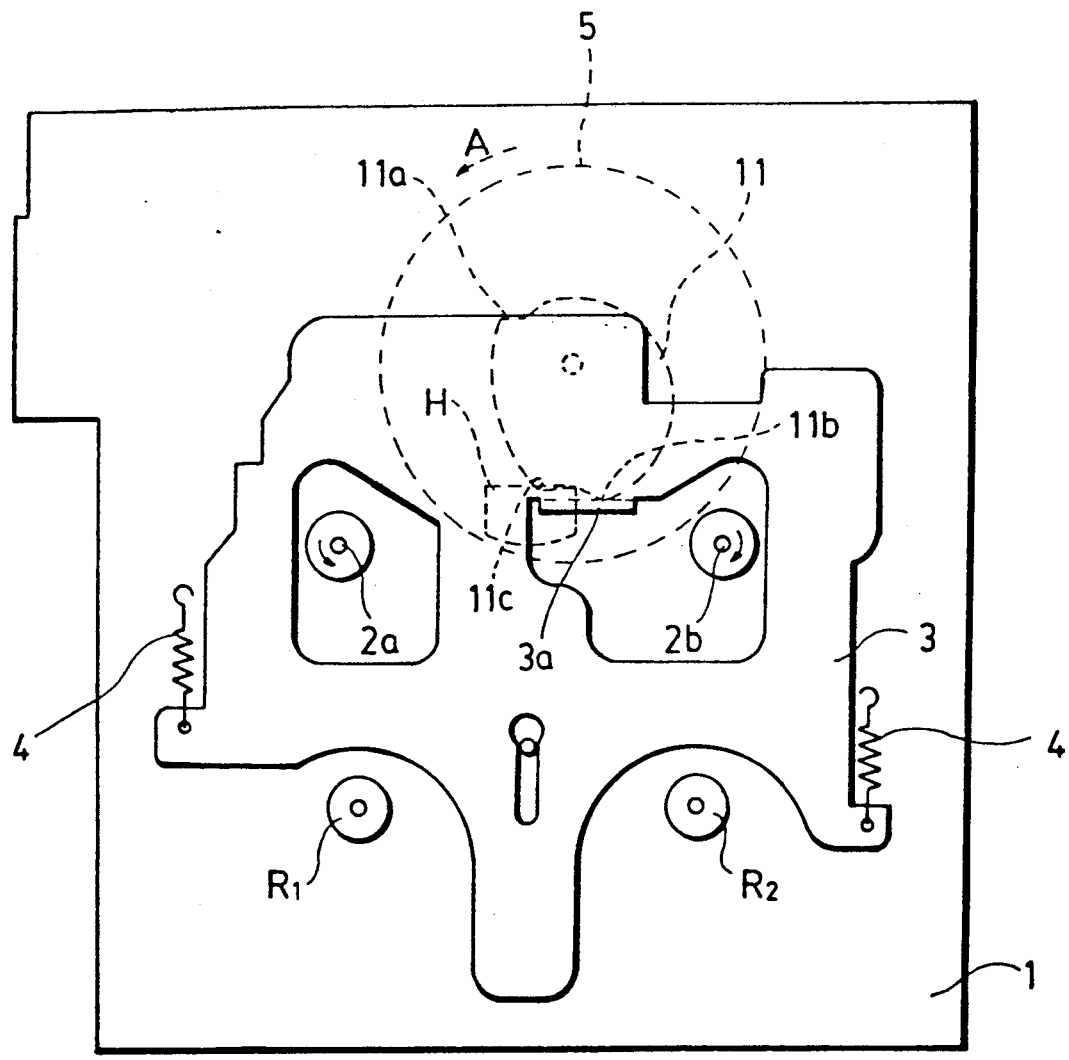
FIG. 2B is a top plan view of the chassis in the forward play mode.

The forward play mode will be described with reference to FIGS. 2A and 2B. As the change-over gear 5 is unlocked from the state shown in FIG. 1A, the change-over gear 5 rotates to bring its toothed portion into engagement with the drive gear 6 instead of the non-toothed portion $X_1$, so that the change-over gear 5 is rotated in the direction of the arrow A by the torque of the drive gear 6. The solenoid S is in energized state when the change-over gear 5 has been rotated to the position shown in FIG. 2A. As a result, the trigger lever 8 is driven clockwise so that the stopper 5b abuts the lock pin 9b so as to loosen the changeover gear 5 in this rotational position with its nontoothed region $X_2$ positioned to oppose the drive gear 6. It is to be noted that the tape player described has two types of play modes: namely, forward play mode and reverse play mode. Which one of these two types of pay mode is to be selected is determined when the mode is changed from the stop mode to the play mode. FIG. 2A shows the state of the components in the forward play mode.

If the solenoid S is kept de-energized after unlocking of the change-over gear 5 from the state shown in FIG. 1A, the trigger lever 8 is kept urged counterclockwise by the force of the spring 10, so that the arm 8b is kept apart from the pressed portion 12a of the mode change-over lever 12. In consequence, the mode change-over lever 12 has been pulled in the direction of the arrow B by the force of the spring (not shown) connected thereto. Consequently, the sliding portion 12c of the mode changeover lever 12 is moved from the outer peripheral surface 14b into the recess 14c of the inner cam 14, thereby causing the mode change-over lever 12 to move once further in the direction of the arrow B. Consequently, the sliding portion 12c of the mode change-over lever 12 slides along the outer peripheral surface of the inner cam 14 so as to be set to a state shown in FIG. 2A. Since the mode change-over lever 12 has been moved in the direction of the arrow B, one of the pair of pinch rollers which opposes the capstan 2a is selected. Therefore, in the play mode shown in FIGS. 2A and 2B, only the pinch roller opposing the capstan 2a is caused to press the tape onto the capstan when the head base 3 is moved downward as viewed in the FIG. In consequence, the tape is fed forward by the cooperation between the capstan 2a and the associated pinch roller. At the same time, the reel base $R_1$ operates to drive the associated tape reel so as to take up the tape. Recording or reproduction is conducted by the magnetic head H during the forward running of the tape.

When the change-over gear 5 has started to rotate from the stop mode position shown in FIG. 1A, the sliding portion 12c moves into the recess 14d of the inner cam 14 so that the mode change-over lever 12 is further moved in the direction of the arrow B. In this case, however, the restriction pin 19 provided on the end of the arm 8b of the eject change-over lever 18 abuts the outer peripheral surface 15a of the outer cam 15. Consequently, the mode change-over lever 12 is prevented from moving in the direction of the arrow B so that its restriction groove 12 holding the pin 18b, thereby preventing counterclockwise rotation of the eject change-over lever 18 by the spring 17. Consequently, the eject change-over lever 18 is held in the states shown in FIGS. 1A and 2A even when the sliding portion 12c is moved into the recess 14d. As a result, the intermittent gear 25 is kept locked due to engagement between the lock pin 26a and the arm 21a of the eject timing lever 21.

If the solenoid S is kept in the energized state after unlocking of the change-over gear 5 from the state shown in FIG. 1A, the arm 8b of the trigger lever 8 presses the pressed portion 12a so that the mode change-over lever 12 is pushed in the direction of the arrow C. Therefore, a rotation of the change-over gear 5 causes the sliding portion 12c to move along the outer peripheral surface of the outer cam 15 (see FIG. 3). As a result, the mode change-over lever 12 is moved by the outer cam 15 in the direction of the arrow C to the second position mentioned before. As a result, the operation mode is switched to the reverse play mode. Namely, the movement of the mode change-over lever 12 to the second position causes the pinch roller opposing the capstan 2b to be selected. In this play mode, therefore, the pinch roller opposing the capstan 2b presses the tape onto the capstan 2b so that the tape is fed in the reverse direction by the cooperation between the capstan 2b and the associated pinch roller. At the same time, the reel base $R_2$ is driven to enable the associated tape reel to take up the tape. During the reverse running of the tape, the magnetic head H is held in contact with the tape so as to perform recording or reproduction.

Figure 3:
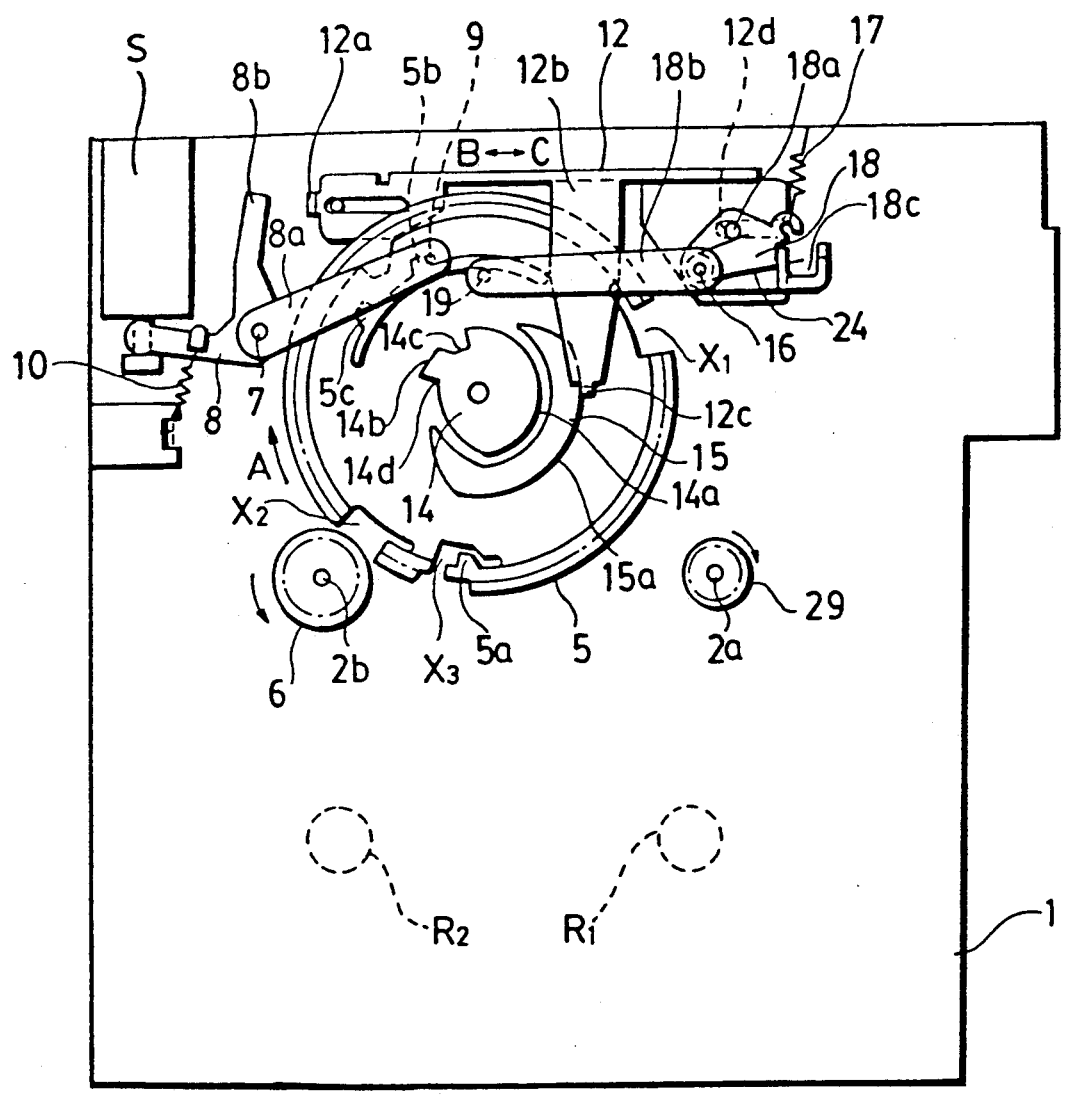
FIG. 3 is a bottom plan view of the chassis in a reverse play mode.

Thus, in the reverse running play mode illustrated in FIG. 3, the mode change-over lever 12 is set in the second position as it has been pushed by the outer cam 15. The pin 18a is still held in the restriction groove of the mode change-over lever 12 even in this state. Therefore, the eject change-over lever 18 and the eject timing lever 21 are held in the positions shown in FIG. 1A, so that the intermittent gear 25 also is kept in locked state. A description will now be given of the operation in the cue mode with reference to FIGS. 4A and 4B.

When the solenoid S is de-energized during operation in the forward play mode shown in FIG. 2A, the trigger lever 8 rotates counterclockwise by the force of the spring 10 so that the lock pin 9 is disengaged from the stopper 5b. AS a result, the change-over gear 5 is rotated in the direction of the arrow A by the resetting fore of the head base 3. When the solenoid S is energized again, the trigger lever 8 rotates clockwise so that the stopper 5v is brought into contact with the lock pin 9 thereby locking the change-over gear 5. In this state, the non-toothed region $X_3$ of the change-over gear 5 opposes the drive gear.

Figure 4A:
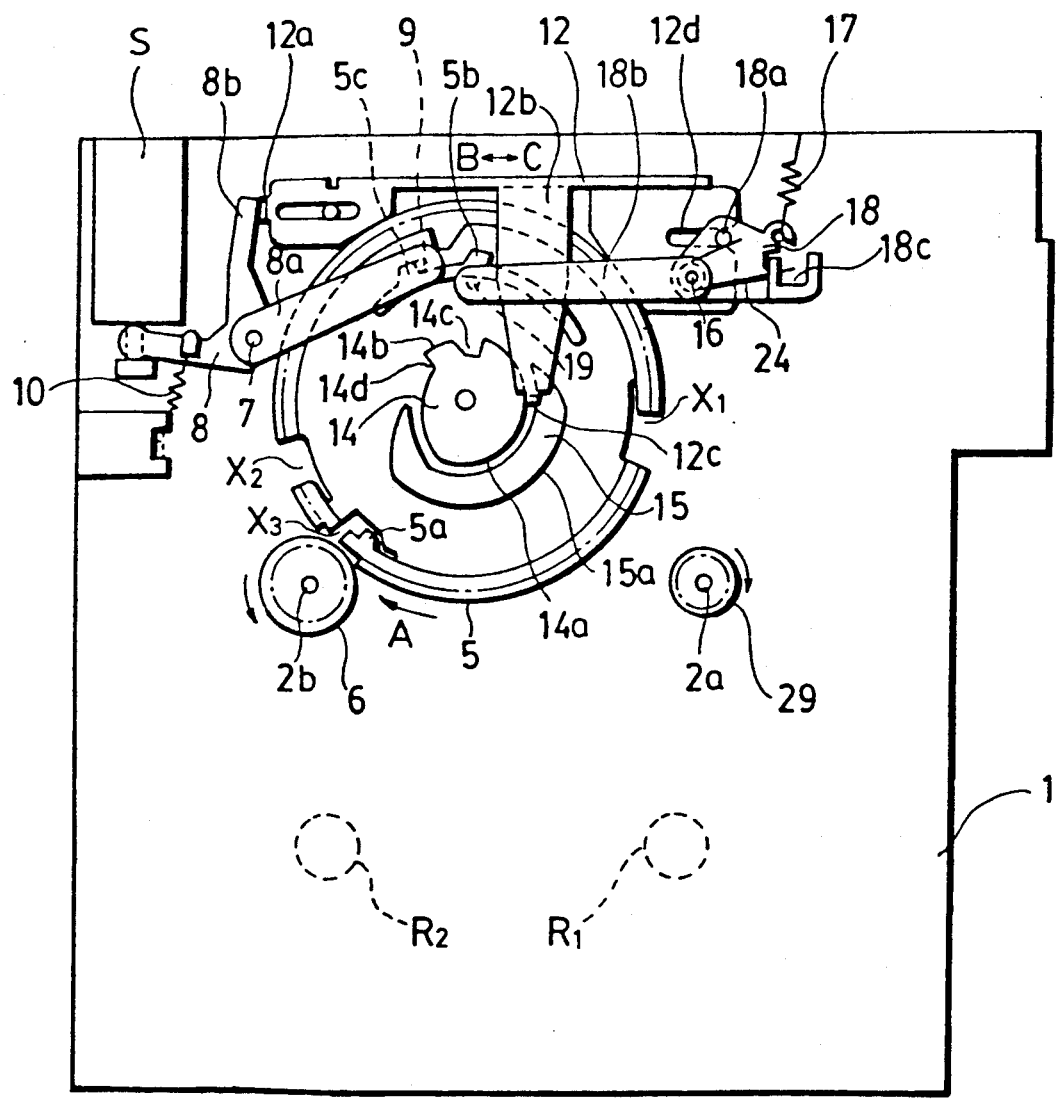
FIG. 4A is a bottom plan view of the chassis in a cue mode.
Figure 4B:
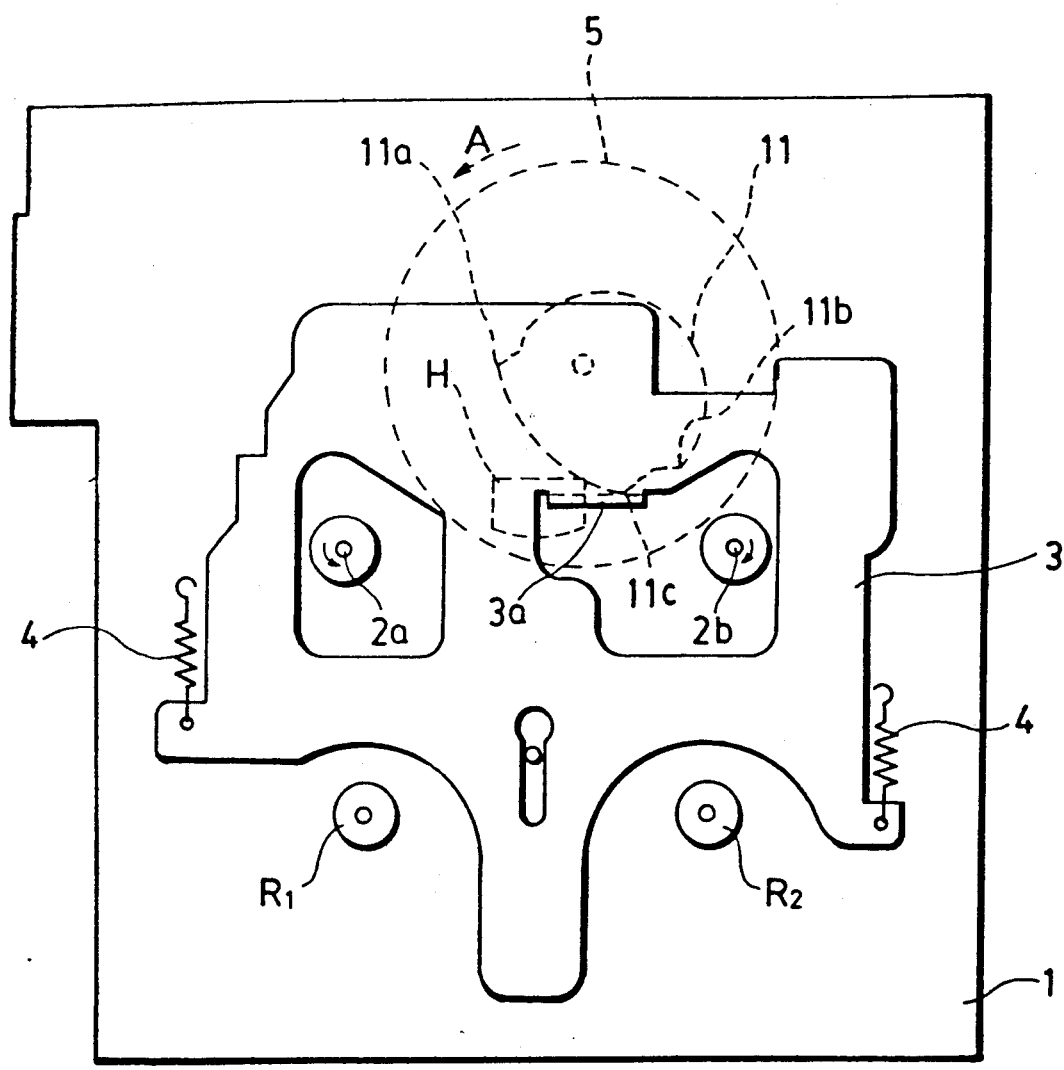
FIG. 4B is a top plan view of the chassis in the cue mode.

The sliding portion 12c of the mode change-over lever 12 is still kept in contact with the outer peripheral surface of the inner cam 14, as shown in FIG. 4A. Meanwhile, as shown in FIG. 4B, the portion 11c of the cam 11 on the upper surface of the change-over gear 5 is brought into contact with the tab 3a so that the head base 3 is retracted upward as viewed in the drawing to a position slightly above the position of the head base 3 in the play mode. In this state, the magnetic head H contacts the tape with a reduced pressure and the pinch rollers are spaced apart from the capstan 2a,2b. At the same time, the reel base $R_1$ is driven at high speed so as to take up the tape at high speed.

The operation in the review mode is as follows.

When the change-over gear 5 is unlocked from the state of the reverse play mode shown in FIG. 3, the change-over gear 5A is slightly rotated in the direction A so that the stopper 5c is locked by the lock pin 9 as is the case of the state shown in FIG. 4A. Meanwhile, the head base 3 is set in the same position as that in the cue mode. Then, the reel base $R_2$ is driven at high speed to take up the tape at high speed.

When the solenoid S is de-energized in the state of cue mode or review mode in FIG. 4A, the lock pin 9 is moved apart form the stopper 5c so that the change-over gear 5 is driven in the direction of the arrow A, thus switching to the stop mode shown in FIGS. 1A and 1B.

A selection as to whether the eject operation for ejecting a cassette half is to be conducted is executed during the change of the operation from the cue mode or the review mode to the stop mode.

When ejection of the cassette half 60 is to be conducted, the solenoid S is energized immediately before the play mode is set to the stop mode shown in FIG. 1A from the cue mode or the review mode shown in FIG. 4. Then, the arm 8b of the trigger lever 8 pushes the mode changeover lever 12 for a short time in the direction of the arrow C. Therefore, the sliding portion 12c of the mode change-over lever 12 can move to the outer peripheral surface 14b of the inner cam 14 without dropping into the recess 14c during the rotation of the change-over gear 5 in the direction of the arrow A. Thus, the mode change-over lever 12 is held substantially in the first position without substantially moving in the direction of the arrow B during the change of the mode from the cue or review mode to the stop mode. In consequence, the pin 18b is not disengaged from the restriction groove 12d in the mode change-over lever 12, so that the intermittent gear is locked by the eject timing lever 21.

Figure 5:
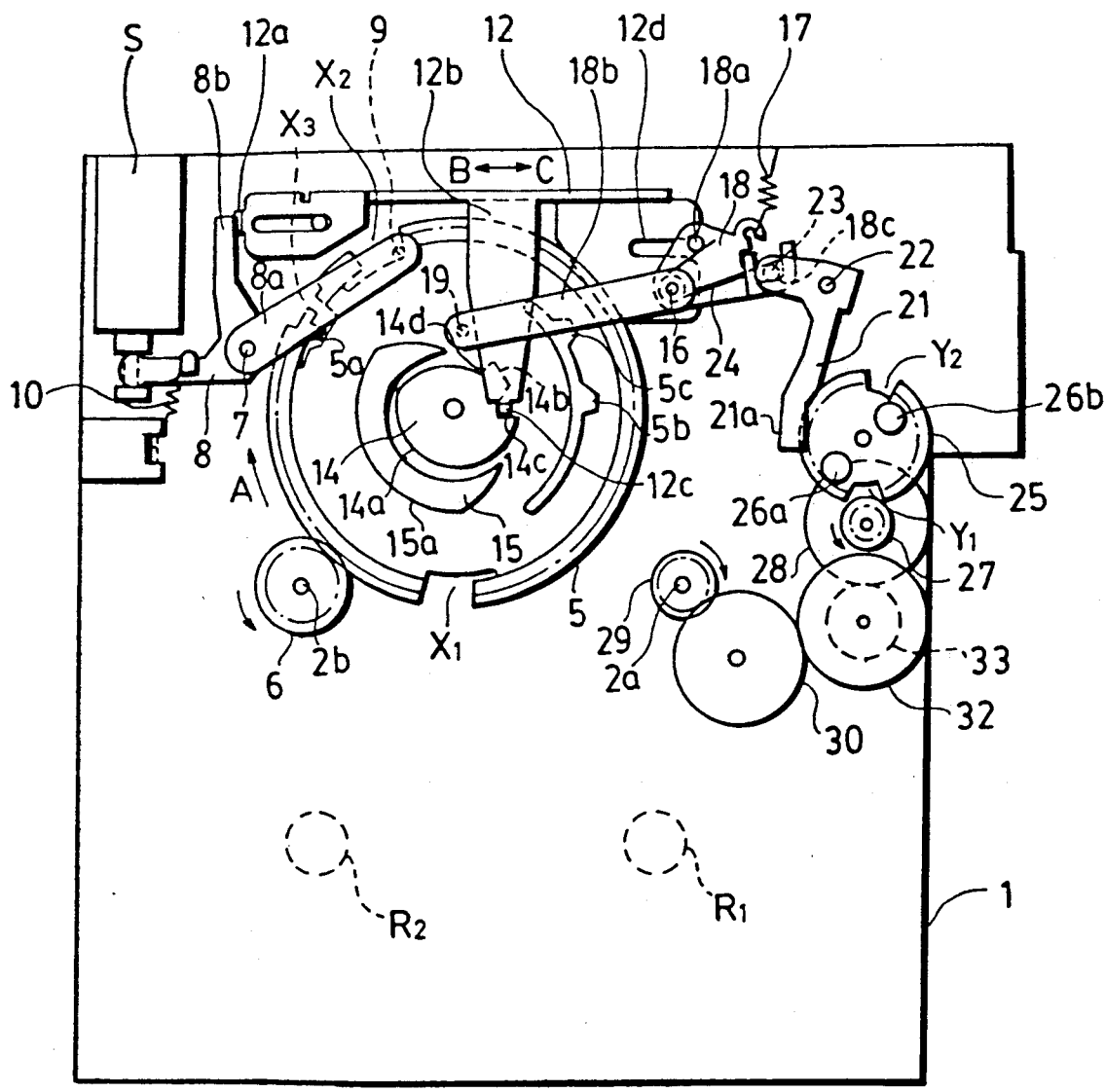
FIG. 5 is a bottom plan view of the chassis in an eject mode.

When an instruction is given for ejecting the cassette half, the solenoid S is not energized in the transient period during the change of the state from the cue or review mode to the stop mode, so that the arm 8b of the trigger lever 8 is kept away from the mode change-over lever 12. Therefore, the sliding portion 12c of the mode change-over lever 12, which is urged by the spring in the direction of the arrow B, drops into the recess 14d in the cam 14 immediately before the player is set to the stop mode, as shown in FIG. 5. As a result, the mode change-over lever is largely moved in the direction of the arrow B to the third position. In this state, as shown in FIG. 5, the restriction groove 12d of the mode change-over lever 12 is disengaged from the pin 18a so that the eject changeover lever 18 is released to allow the eject change-over lever 18 to rotate counter clockwise by the force of the spring 17. In response to this operation, the eject timing lever 21 is driven clockwise so that the arm 21a of the eject timing lever 21 leaves the lock pin 26a of the intermittent gear 25. Therefore, the change-over gear 5 is driven by the drive gear 6 in the direction of the arrow A so as to be set promptly to the position in the stop mode shown in FIG. 1A and locked in this position. In this stop mode, the sliding portion 12c has come onto the outer peripheral surface 14b of the inner cam 14 and the mode change-over lever 12 has been reset in the direction of the arrow C. Consequently, the pin 18a is held by the restriction groove 12d to lock the eject lever 18 again.

Thus, when the cassette ejection instruction is given, the arm 21a of the eject timing lever 21 is disengaged from the lock pin 26a for a short time, immediately before the state of the player is set to the stop mode.

As will be seen from FIG. 6A, when the intermittent gear 25 is locked, the lock pin 26a is urged upward by the force of the spring 40 on the eject drive lever 38. Therefore, as shown in FIG. 6B, when the arm 21a of the eject timing lever 21 is disengaged from the lock pin 26a, the intermittent gear 25 rotates clockwise into meshing engagement with the transmission gear 27. Referring back to FIG. 1A, the transmission gear 27 is rotated counterclockwise by the power of the capstan 2a which is driven constantly. Therefore, the intermittent gear 25 is rotated clockwise by the torque of the transmission gear 27. Meanwhile, the lock pin 26*b* presses the pressed side 38*b* of the eject drive lever 38 in the direction of an arrow E, whereby the eject drive lever 38 is driven in the direction of the arrow E. However, since the eject changeover lever 18 is set again to the locked state shortly, the eject timing lever 21 is urged counterclockwise by the force of the spring 24. Therefore, a 180° rotation of the intermittent gear 25 brings the other lock pin 26*b* into contact with the end of the arm 21*a*, so that the eject lever 38 is reset in the direction of the arrow D so as to be locked as in the case of FIG. 6A. Thus, the eject drive lever 38 makes one cycle of reciprocating operation in the direction of the arrow E in a short period of time. The eject member actuating mechanism, which is shown in FIGS. 7A onwards, is operated in response to one reciprocating cycle of the eject drive lever 38.

A description will now be given of the operation for loading and ejecting a cassette half.

The pressing portions 53*a*, 54*a* of the eject levers 53, 54 are projected in the cassette inserting direction, as shown by one-dot-and-dash line in FIG. 8. The driving tab 54*b* of the eject lever 54 has been moved in the direction of the arrow F. Consequently, the lock lever 61 connected to the driving tab 54*b* has been moved to the left as viewed in FIG. 7A. In this state, the projection 62*a* provided on the drive link 62 is held in contact with the retaining portion 61*a* of the lock lever 61, so that the drive link 62 is stationed after counterclockwise rotation. The connector pin 46 has been lifted by the connector hole 62*c* formed in the end of the drive link 62, so that the pair of cassette holders 43 have been raised with respect to the chassis 1. The forcible bias link 65 also has been rotated counterclockwise following up the movement of the drive link 62.

In this state, the user inserts the cassette half 60 into the guide grooves 43*a* of both cassette holders 43 and pushes the same inward. Consequently, the pressing portions 53*a*, 54*a* of the eject levers 53, 54 are pushed in towards each other until the eject levers 53, 54 are in the contracted position as shown by solid lines in FIG. 8, with the driving tab 54*b* of the eject lever 54 moved from the position F to the position G. As a result, the lock lever 61 connected to this driving tab 54*b* is driven rightward from the position shown in FIG. 7A to the position shown in FIG. 7B. During this operation, the retaining portion 61*a* of the lock lever 61 is disengaged from the projection 62*a* of the drive link 62, whereby the drive link 62 is unlocked. Immediately after the unlocking, the drive link 62, together with the forcible bias link 65, is driven clockwise by the force of the spring 66.

The rotation of the drive link 62 causes the cassette holders 43 to move down onto the chassis 1 through the action of the connector pin 46, so that the cassette half 60 is loaded.

When a cassette eject instruction is given, the eject drive lever 38 makes one cycle of reciprocating movement as indicated by the arrow E. During this reciprocating movement of the eject drive lever 38, the driving tab 38*c* provided on the eject drive lever 38 abuts the side edges of the drive link 62 and the forcible bias link 65 so as to rotate the latter counterclockwise. Meanwhile, the lock lever has been urged to the left as viewed in FIG. 7B by the force of the spring 56 which urges the eject levers 53 and 54. Therefore, as the drive link 62 is rotated counterclockwise to the position shown in FIG. 7A, the lock lever 61 is set to a position where the retaining portion 61*a* engaged with the projection 62*a*. At the same time, the drive link 62 is reset to and locked in the state shown in FIG. 7A. During this rotational operation of the drive link 62, the cassette holders 43 are raised to lift the cassette half 60 above the chassis 1. Meanwhile, during the movement of the lock lever 61 to the position shown in FIG. 7A, the eject levers 53 and 54 are expanded to the state shown by one-dot-and-dash line in FIG. 8 by the force of the spring 56, whereby the cassette half 60 is pushed back to the inlet opening by the pressing portions 53*a*, 54*a* of the eject levers 53, 54.

According to the present invention, the eject mechanism is actuated by the movement of the mode changeover lever to the third position caused by a rotation of the change-over gear. Therefore, a solenoid, which heretofore has been necessary for actuating the eject mechanism or for determining the timing of ejection, is eliminated so as to reduce the size and power consumption of the apparatus. In addition, since the timing of start of the eject mechanism is determined by the change-over gear, the eject mechanism can operate accurately in timed relation to other mechanisms which also are switched by the change-over gear.

What is claimed is:

1. An eject mechanism of a tape player comprising: a change-over gear adapted to be rotatingly driven by a motor; a lock mechanism for locking said change-over gear at predetermined rotational angular positions; an actuator for actuating said lock mechanism; a head base carrying a magnetic head, the position of said head base being controlled in accordance with the angular position of said change-over gear at which said change-over gear is locked; a cam rotatable together with said change-over gear; a mode change-over lever adapted to be controlled by said cam to one of first, second and third positions, said mode changeover lever, when set to said first or second position, selects one of a pair of pinch rollers to be put into contact with an associated capstan; an eject timing member for conducting a switching operation to allow transmission of the power of said motor to an eject actuating mechanism when said mode change-over lever is set to said third position; and a cassette eject member for ejecting a tape cassette when said eject actuating mechanism is driven by the power of said motor.

* * * * *